United States Patent [19]

Kovats

[11] 4,413,881
[45] Nov. 8, 1983

[54] OPTICAL FIBER HERMETIC SEAL

[75] Inventor: Tibor F. I. Kovats, Ottawa, Canada

[73] Assignee: Northern Telecom Limited, Montreal, Canada

[21] Appl. No.: 312,834

[22] Filed: Oct. 19, 1981

Related U.S. Application Data

[63] Continuation-in-part of Ser. No. 61,501, Jul. 26, 1979, abandoned.

[51] Int. Cl.³ .............................................. G02B 7/26
[52] U.S. Cl. .................................. 350/96.20; 65/154; 228/122; 228/132; 264/271.1
[58] Field of Search ............... 350/96.20, 96.21, 96.22; 250/552; 357/17, 19; 174/74 R, 75 R, 77 R; 264/271.1; 65/59 R, 154; 228/122, 132, 903

[56] References Cited

U.S. PATENT DOCUMENTS

| | | | |
|---|---|---|---|
| 3,455,625 | 7/1969 | Brumley et al. | 350/96.22 |
| 3,919,037 | 11/1975 | Miller | 350/96.21 X |
| 4,119,363 | 10/1978 | Camlibel et al. | 350/96.20 |
| 4,208,093 | 6/1980 | Borsuk | 350/96.20 |

FOREIGN PATENT DOCUMENTS 2016729  9/1979  United Kingdom ............. 350/96.20

OTHER PUBLICATIONS

Physical Data Applications on "Low Melting Temperatures and Controlled Shrinkage Characteristics Make These Bismuth Alloys Valuable Tools of Industry", Cerro Sales Corp., N.Y.C., New York.
Rich et al., "A Simple Optical Fiber-To-Metal Hermetic Seal", Ceramic Bulletin, vol. 57, No. 2, (1978), pp. 234-235.

Primary Examiner—John D. Lee
Attorney, Agent, or Firm—Stuart L. Wilkinson

[57] ABSTRACT

A hermetic seal for an optical fiber is fabricated by casting or molding a mass of fusible alloy around the fiber so that the alloy solidifies within a confined space. The alloy used is characterized by low thermal coefficient of expansion, minimal relaxation after solidification, and appreciable expansion as it solidifies, thereby to create a stable pressure contact at its interface with the optical fiber. The solidified mass may be subsequently soldered into a passage through a wall of a fiber optic device package. Alternatively, the mold within which the mass of alloy is encased or molded may, itself, be soldered into the passage.

17 Claims, 5 Drawing Figures

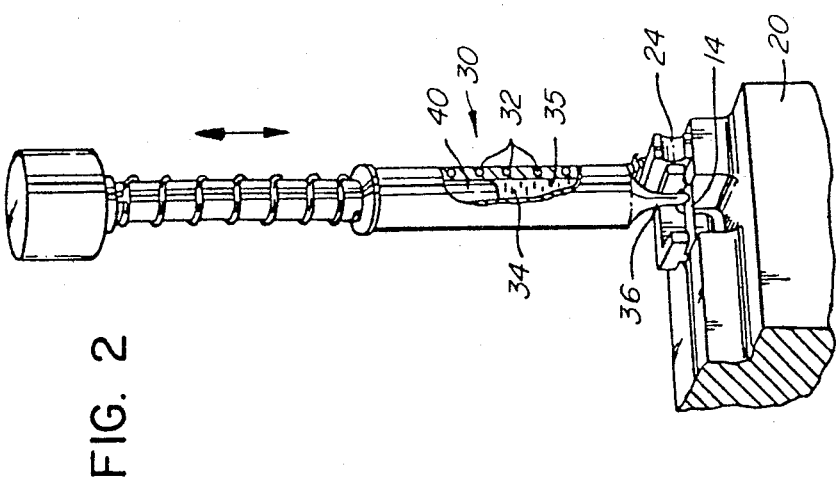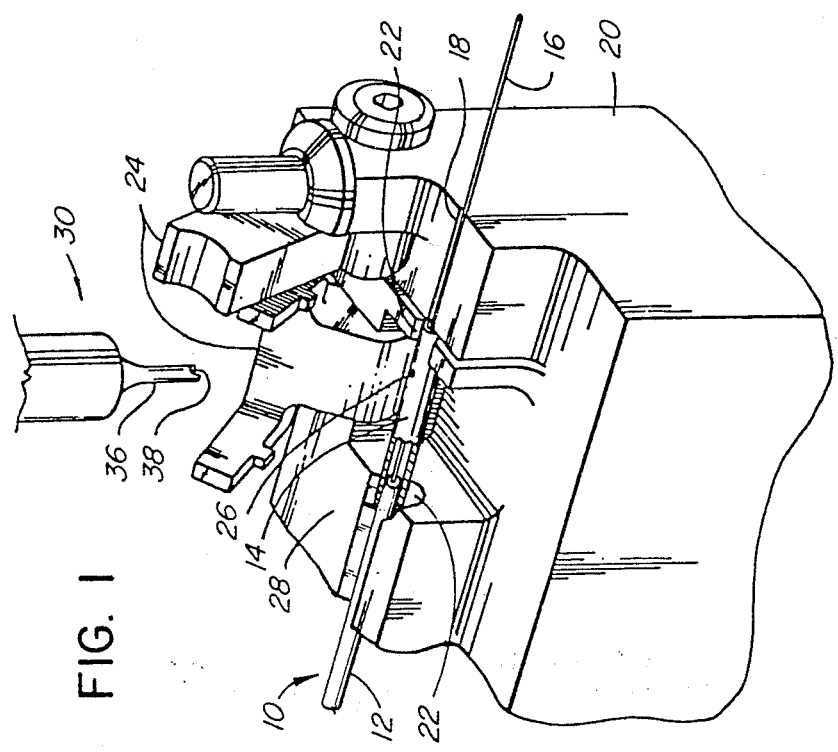

OPTICAL FIBER HERMETIC SEAL

This is a Continuation-In-Part application of application Ser. No. 61,501 filed July 26, 1979 and now abandoned.

This invention relates to a hermetic seal for an optical fiber. The invention extends to a fiberoptic device package incorporating such a seal and to a method of making the seal.

An optical fiber hermetic seal is frequently required where an optical fiber enters or exits a fiberoptic device package in order to combat the adverse affects, such as fluctuating performance and reduced lifetime, of moisture and gaseous contaminants on components such as lasers and photodiodes within the package. A known fiberoptic hermetic seal is described by Camlibel et al in U.S. Pat. No. 4,119,363. The patent describes an optical fiber feedthrough which is fabricated by hermetically sealing a length of the fiber within a metal cylindrical tube and then soldering the tube in an aperture in the wall of the fiberoptic package. The hermetic seal is made by threading the optical fiber through a small diameter bore in the end of a hollow cylindrical tube and then, from the other end, pouring molten 60:40 tin:lead solder into a chamber within the cylinder so as to surround the optical fiber. Camlibel et al describes how, because of contraction, the solder presses against the fiber. The resulting stress in the glass at the glass-solder interface is compressive which is beneficial in inhibiting crack growth in the fiber. However, since the thermal expansion coefficients of the solder and the tube material are relatively high and are deliberately chosen to be materially different from one another, then the arrangement does have one significant disadvantage. Thus, the very difference in expansion coefficients which ensures the creation of pressure at the fiber surface during cooling also deleteriously affects the hermetic seal subsequently during normal temperature cycling.

A second disadvantage of this known seal is that, in practice, a flux material is necessary in order to ensure that the solder will fuse to the inside surface of, for example, a copper tube. However, there is a tendency, if using flux, for the material to be deposited on the fiber. If this happens, it renders the seal between the solder and the fiber useless.

To overcome these defects, there is proposed by the present invention in place of the solder used by Camlibel et al, a fusible alloy characterized by appreciable expansion during solidification.

According to one aspect of the present invention there is provided a hermetic seal around a fiber, the seal provided by a mass of a fusible alloy extending around the fiber to encase a part thereof, the fusible alloy characterized by appeciable expansion on solidification. The fusible alloy preferably exhibits minimal dimensional change after solidification, and a low thermal expansion coefficient. The fusible alloy is preferably a bismuth containing alloy having a composition, for example, of 40% bismuth and 60% tin. The fusible alloy preferably forms a cylindrical casting or molding around the fiber part. The alloy preferably exhibits expansion on solidification of at least 0.2%. The alloy preferably has a coefficient of thermal expansion less than 0.00004 per °C. and exhibits linear dimensional change, such as shrinkage, of less than 0.1%.

The fused alloy can be cast or molded into a metal tube whereby the encased fiber part is adapted for soldering into a passage in, for example, a fiberoptic package wall. Alternatively the mass of fused alloy encasing the fiber part can be soldered directly into such a passage.

According to another aspect of the invention, there is provided a method of producing a seal at the surface of an optical fiber, the method comprising encasing the fiber in a mass of molten fusible alloy, said alloy characterized by appreciable expansion on solidification, and solidifying the alloy within a mold extending around the fiber part whereby to produce a contact pressure at an interface between the alloy and the surface of the optical fiber part. Preferably, the fusible alloy contains bismuth. Preferably, the optical fiber part is encased within a hollow cylindrical molding. The fiber can be located substantially aligned with a central longitudinal axis of the cylindrical mold to define an elongate chamber between mold and the optical fiber. Ends of the chamber can be closed and molten fusible alloy injected through a port in the wall of the mold to fill the enclosed chamber. The fiber encased within the fused alloy can then be broken out of the mold or the mold can be maintained in a position surrounding the solidified alloy. The alloy itself or the mold can then be soldered into a passage through the wall of a fiberoptic device package in order to produce an optical fiber feedthrough.

Embodiments of the invention will now be described, by way of example, with reference to the accompanying drawings in which:

FIG. 1 is a perspective, part-sectional, non-scaler view showing a stage in the fabrication of a hermetically sealed optical fiber according to the invention;

FIG. 2 is a perspective, part-sectional, non-scaler view showing a subsequent stage in the fabrication of the hermetically sealed optical fiber;

Figure 4:
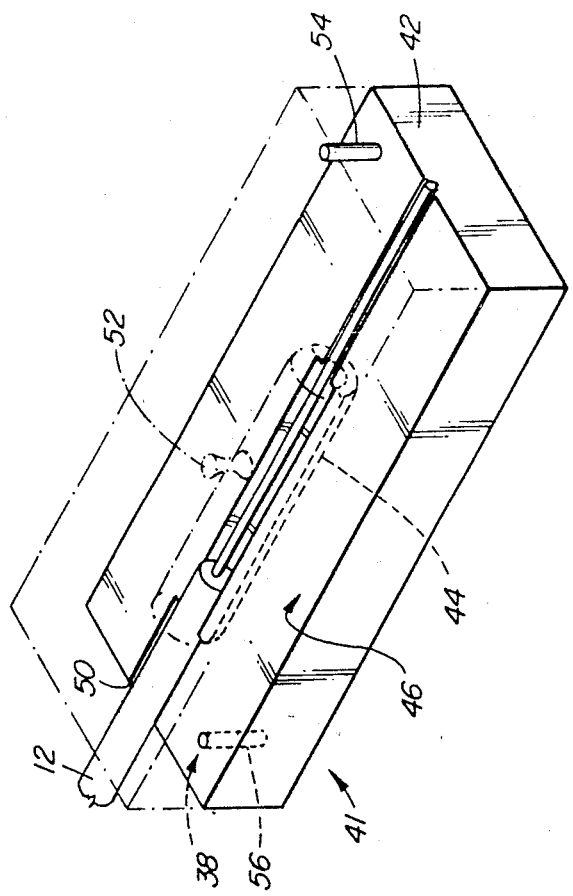
FIG. 4 is a perspective, part-sectional, non-scaler view showing another example of hermetically sealed optical fiber.

Referring in detail to FIG. 1, there is shown an optical fiber 10. An end part of the fiber is stripped of protective jacket 12 and cleaned in order to prepare it for sealed encasing. The end part of the fiber is passed through a brass tube 14 so that a length 16 projects beyond the tube end. The length 16 is supported within a shallow groove 18 in a jig 20, the tube 14 being itself supported in a contiguous, relatively deeper groove 22. Dimensions and relative positioning of the grooves 18, 22 are chosen so that the central axis of the fiber length 16 is aligned with the tube central axis. With the fiber length 16 located in groove 18, a closure member 24 is pivoted from an open position, as shown in FIG. 1, to a closed position, shown in FIG. 2. In the latter, the closure member resiliently clamps the fiber 1 and simultaneously blocks the end of the tube 14.

The tube 14 has an inlet port 26 for injection of molten alloy, the tube internal diameter being slightly larger than the jacketed fiber diameter at one end of the tube.

Reciprocally mounted above the port 26 is a thermally controlled syringe 30. The syringe incorporates a heater element 32 around a cylinder 35 filled with alloy 34. A hollow needle 36 has its end formed with a concave rim 38 in order that when the needle end is pressed against the tube 14, the needle end and the tube at the circumference of the port 26 form a seal preventing escape of alloy.

In operation, once the fiber 10 and the tube 14 are supported in the positions shown, the closure member 24 is moved to the FIG. 2 position and alloy 34 is introduced into the cylinder 35. The alloy is characterized by a low coefficient of thermal expansion, minimal relaxation effect after solidification, and most importantly, by the property of expanding during solidification. A fusible alloy of tin: 60% and bismuth: 40% sold under the trademark Cerrocast has the required characteristics, thus:

(i) coefficient of thermal expansion—0.000015 per °C.

(ii) linear shrinkage after solidification—0.01%

(iii) linear growth on solidification—0.5%

Other fusible alloys which key well to glass, which have both a low thermal coefficient of expansion, and a low relaxation coefficient, which exhibit expansion on solidification, and which have desired flow and sealing characteristics can be readily determined by those familiar with the art. A further example is the alloy of 58% bismuth and 42% tin.

The alloy 34 is heated by the element 32 until molten and is then injected down the needle 36 by means of reciprocal piston 40. Molten alloy passes through the port 26 and into the tube 14. The closure member 24 prevents molten alloy from escaping at the near tube end and the fiber jacket prevents alloy from escaping from the remote end of the tube. The fusible alloy is then allowed to soldify by cooling. Since solidification takes place within a confined chamber, resulting expansion of the fusible alloy causes the fiber to be subjected to pressure at its interface with the alloy. The interface pressure is desirable since it enhances the hermetic seal between the glass and the fusible alloy and it discourages crack formation in the glass. Moreover, since the fusible alloy has negligible shrinkage and low thermal coefficient of expansion, the pressure exerted by it on the fiber is substantially invariable so contributing to long term integrity of the alloy-glass seal.

Figure 3:
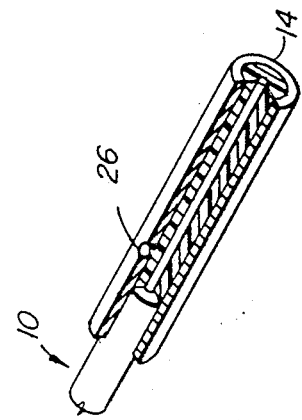
FIG. 3 is a perspective, part-sectional, non-scaler view showing one example of hermetically sealed fiber.

The encased fiber end produced by the method described is shown in FIG. 3. Basically, the stripped end of the fiber 10 is compressively embraced by a cylinder of fusible alloy which itself is embraced by the cylindrical tube 14. An alternative example of encased fiber end is shown in FIG. 4. It corresponds to the FIG. 3 embodiment in most respects except that it lacks the tube 14. The FIG. 4 embodiment can be produced using the apparatus shown in FIGS. 1 and 2 except that the tube 14 is replaced by a mold 41. A suitable two-part mold, one of the parts 42 being shown in bold line and the other part being shown in phantom, is illustrated in FIG. 4. The mold parts are made of stainles steel and define a cylindrical chamber when secured together. At both ends of the semicircular recess 44 in the respective mold parts, a V-section groove 50 extends into the mold junction face 46, one groove of a size to receive the jacketed fiber and the other groove of a size to receive the stripped fiber. Bell-mouthed port 52 provides a means for injecting molten fusible alloy. It will be understood that the two parts 42 of the mold are symmetrical so that when the parts are put together with a guide pin 54 on one part locating in a guide hole 56 in the other part, the mold defines a cylindrical chamber with narrow square section passages extending from the ends of the chamber to ends 38 of the mold.

In operation, to encase an optical fiber, the silicone or other protective jacket is stripped from the fiber end using solvent, heat, or mechanical force. The fiber end is then cleaned in order to prepare it for encasing in the fusible alloy. The end part of the optical fiber is laid within one mold part 42 so that a section of the fiber projects beyond the mold end. The fabrication method described with respect to FIGS. 1 and 2 is then followed with the second mold part being secured to the first mold part preparatory to fusible alloy injection. The outer silicone jacket 12 of the fiber is slightly resilient so it tends to deform into the square section passage formed by the opposed V-grooves 50 at one end of the mold. The stripped fiber fits snugly within the square section passage at the other end of the mold so preventing egress of molten alloy. The mass of fused alloy extends along to the jacketed portion of the fiber so allowing the fiber to be slightly flexed relative to the fused alloy mass without severely stressing the fiber at the point where it enters the molding.

Figure 5:
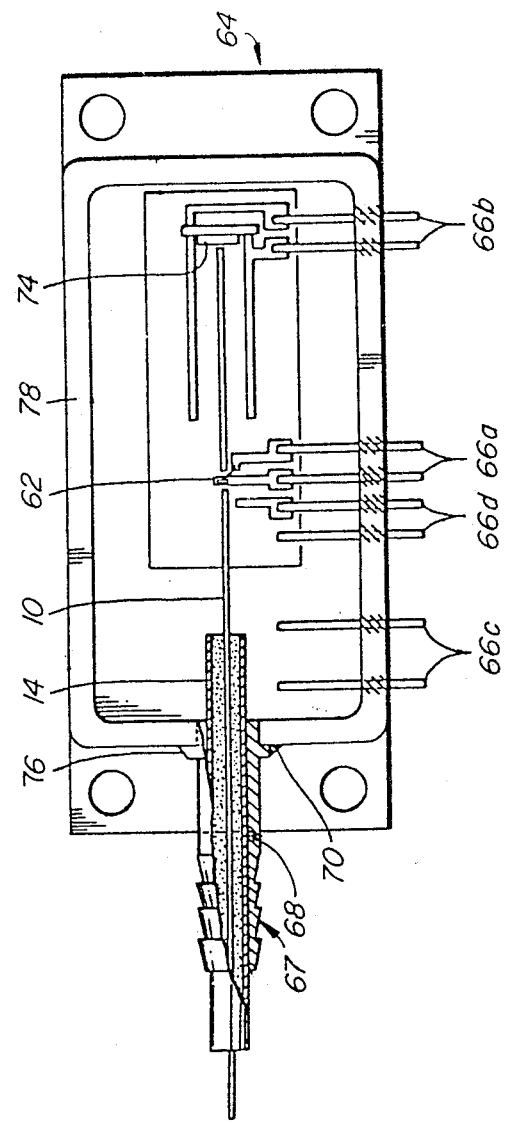
FIG. 5 is a part-sectional, non-scaler plan view of a device package incorporating the hermetic feedthrough of FIG. 3.

Turning now to FIG. 5, there is shown a laser package utilizing the hermetic feedthrough of FIG. 1. A GaAlAs double heterostructure injection laser 62 is mounted in an open-topped housing 64. Through a sidewall of the housing extend hermetically sealed leads 66; 66a to the laser 62; 66b to a photodetector 74; 66c for a thermoelectric cooler (not shown); and 66d for a temperature sensor (not shown). In an end wall is mounted the optical fiber feedthrough. The feedthrough has a brass barrel 68 with a radially extending flange 76 which is soldered, 70, into a bore through the housing wall. The tube 14, with fiber 10 in place, is then soldered into an internal bore extending through the barrel 68. The barrel 68 has a length of resilient tubing, (not shown), which is placed over the barrel and the fiber projecting from it in order to prevent the bending radius of the fiber from falling below a lower limit. The function of the barrel 68 is threefold. Firstly, it provides mechanical strength at the fiber feedthrough. Secondly, it provides alignment of the tube 14 with laser site within the housing. Thirdly, it functions as a heat sink so that when soldering the tube 14 within the housing wall, there is insufficient heat inadvertently to melt the Cerrocast alloy. To complete the package, once all required components have been inserted, a lid (not shown) is seam welded onto the upper rim 78.

When soldering the encased fiber of FIG. 4 into a package wall, a similar method can be used except that the fusible alloy is soldered directly into the barrel 68. A suitable solder for use directly on the Cerrocast is Indalloy No. 8.

What is claimed is:

1. An optical fiber hermetic seal comprising a mass of fusible alloy embracing a length of the fiber, the fusible alloy exerting pressure on the fiber at an interface between the alloy and the fiber, the alloy characterized by appreciable expansion during solidification, the mass of fused alloy being generally cylindrical in shape, the fiber located on a central longitudinal axis of the cylindrical mass of alloy, and the mass of fused alloy being embraced by a hollow cylindrical tube.

2. A hermetic seal as claimed in claim 1, the tube having a diameter only marginally greater than the diameter of the fiber.

3. A seal as claimed in claim 2, in which the tube length is in the range of 0.25" to 1".

4. A seal as claimed in claim 3, in which the tube diameter is in the range of 0.03" to 0.05".

5. In a fiberoptic device package, a hermetic feedthrough at which an optical fiber enters a package housing, the hermetic feedthrough comprising a hermetic seal as claimed in claim 1, said tube being soldered within a bore through a wall of the package housing.

6. A hermetic feedthrough as claimed in claim 5, in which a barrel is soldered into said bore in the housing wall and the tube is soldered within the barrel.

7. A method of making a hermetic seal at the surface of an optical fiber, the method comprising supporting a part of the optical fiber in a predetermined position, establishing an enclosed chamber around a part of the fiber, introducing molten fusible alloy through a port in a wall of the chamber thereby to fill the enclosed chamber, the fusible alloy characterized by appreciable expansion on solidification, and solidifying the fusible alloy by cooling whereupon resulting expansion of the alloy produces contact pressure at an interface between the alloy and the optical fiber.

8. A method as claimed in claim 7, in which the chamber extends longitudinally in the direction of the fiber central axis.

9. A method as claimed in claim 8, in which the chamber is a cylindrical chamber having a central longitudinal axis aligned with the central longitudinal axis of the fiber.

10. A method as claimed in claim 7, in which the molten fusible alloy is introduced into the chamber by injection thereof through a port in a wall of a member defining the enclosed chamber.

11. A method as claimed in claim 10, in which said member is of cylindrical tubular form and said chamber is established by closing ends of said tube.

12. A method as claimed in claim 10, in which the member is a tube supported in one reference position, the optical fiber is passed through the tube, and a fiber part projecting beyond the tube is supported in a second reference position so that the fiber end portion is located substantially aligned with the central longitudinal axis of the tube.

13. A method as claimed in claim 12, in which said first and second reference positions are provided by a jig having longitudinally contiguous, vertically offset V-grooves.

14. A method as claimed in claim 13, the jig having a closure member to close one end of the tube during alloy injection.

15. A method as claimed in claim 10, in which the member is a two-part mold.

16. A method as claimed in claim 7, in which the alloy is introduced into the chamber by injection from a syringe.

17. A method as claimed in claim 16, said chamber defined by a rigid body, the syringe having an outlet nozzle shaped to the outer surface configuration of said rigid body.

* * * * *